United States Patent
Pon

(10) Patent No.: US 8,543,703 B1
(45) Date of Patent: Sep. 24, 2013

(54) METHOD OF TRACKING MOBILE USER SESSIONS

(75) Inventor: Ron Pon, Kanata (CA)

(73) Assignee: Apple Inc., Cupertino, CA (US)

( * ) Notice: Subject to any disclaimer, the term of this patent is extended or adjusted under 35 U.S.C. 154(b) by 3121 days.

(21) Appl. No.: 10/395,243

(22) Filed: Mar. 25, 2003

(51) Int. Cl.
*G06F 15/16* (2006.01)

(52) U.S. Cl.
USPC ............ 709/227; 709/249; 709/245; 709/228; 455/442; 370/352

(58) Field of Classification Search
USPC ......... 709/213, 228, 227, 249, 245; 445/442; 370/331, 352
See application file for complete search history.

(56) References Cited

U.S. PATENT DOCUMENTS

| | | | | |
|---|---|---|---|---|
| 6,363,431 | B1 * | 3/2002 | Hammer et al. | 709/249 |
| 6,603,972 | B1 * | 8/2003 | Sawyer | 455/442 |
| 6,915,436 | B1 * | 7/2005 | Booth et al. | 726/3 |
| 6,915,438 | B2 * | 7/2005 | Boros | 713/322 |
| 6,976,177 | B2 | 12/2005 | Ahonen | |
| 7,117,266 | B2 * | 10/2006 | Fishman et al. | 709/228 |
| 2004/0081140 | A1 * | 4/2004 | Martin | 370/352 |
| 2005/0209768 | A1 * | 9/2005 | Degner et al. | 701/103 |
| 2005/0223114 | A1 * | 10/2005 | Hanson et al. | 709/245 |
| 2006/0209768 | A1 * | 9/2006 | Yan et al. | 370/338 |

* cited by examiner

*Primary Examiner* — Tammy Nguyen
(74) *Attorney, Agent, or Firm* — Meyertons, Hood, Kivlin, Kowert & Goetzel, P.C.

(57) ABSTRACT

In order to improve the mobility of mobile clients, network efficiency and increase the performance of mobile computing and communication environments, provided by the invention is a method of tracking mobile client sessions. The method according to an embodiment of the invention enables mobile computing and communication environments to provide seamless handoffs of both non-secure and secure IP connections between access points and between network domains.

20 Claims, 3 Drawing Sheets

METHOD OF TRACKING MOBILE USER SESSIONS

FIELD OF THE INVENTION

This invention relates generally to mobile communications and, in particular, to tracking mobile user sessions.

BACKGROUND

In a communication system (network) that abides by Internet Protocol (IP) standards and recommendations an IP address assigned to a particular computing device is typically used to identify the computing device and corresponding IP packets originating from the computing device. Historically, this method of identification was not a problem because computing devices were assumed to remain fixed relative to an Access Point (AP) for the duration of an IP session. Thus, each computing device could be expected to maintain a single unique IP address for the duration of an IP session; and, accordingly, the unique IP address could be used as an identifier.

However, in a mobile computing and communication environment a mobile computing device (mobile unit) may be reassigned a different IP address each time the mobile unit moves from a coverage area of one access point into another coverage area (possibly serviced by another access point) during a single IP session. Similarly, an IP address assigned to a mobile unit is likely to change when the mobile unit moves (roams) from one network domain into another network domain. Thus, there is a problem for other devices in a system trying communicate with a particular mobile unit, since the other devices cannot easily identify the common origin of multiple IP packets (originating from the same mobile unit) that may each have different IP addresses.

The problem is further complicated when the mobile computing device has established a secure IP connection to a private network, Virtual Private Network (VPN) or server, using for example IPSec which is a commonly known standard used to add security to TCP/IP-based communications. Secure IP connections can be used to safeguard the right to access information transferred between two or more parties (typically the term "secure IP connection" refers to encryption at the network layer (OSI layer 3)). However, a secure IP connection in a mobile environment is broken when a mobile unit having established the secure IP connection using a first IP address is forced to change to a second IP address. The secure IP connection is lost because the private network (or VPN) will no longer recognize IP packets from the mobile unit as belonging to (or originating from) the mobile unit because: i) recognition is based on the IP address of a mobile unit; and ii) the second IP address assigned to the mobile unit is different from the first IP address that was used to establish the secure IP connection.

Typically when a secure IP connection is lost all IP packets sent from a mobile unit to a private network (or VPN) are dropped or ignored. Consequently, a new communication channel must be re-established. This procedure is typically time consuming and inconvenient. The result is that the efficiency advantages of the mobile environment that arise from allowing a user to be mobile are curbed by the inability of present mobile computing and communication environments to effectively provide seamless handoffs of non-secure and secure IP connections between coverage areas and between network domains.

There have been prior solutions proposed to minimize the effects of this problem, such as Mobile IP and Tunnelling. However, the prior solutions typically require additional hardware to be added to the communication system and overhead to be added to IP packets. Moreover, the complexity of the previous solutions limit, and often degrade, the performance and efficiency of the communication systems that they are integrated into.

SUMMARY OF THE INVENTION

According to a first aspect of the invention, provided is a method for a first computing device to identify a second computing device, wherein both the first and second computing devices have addresses. The method involves: i) The first computing device associating a unique tag with the second computing device that is not the respective address of the second computing device or another address; ii) The first computing device transmitting the unique tag to the second computing device so that the second computing device is made aware of the unique tag; iii) The second computing device including the unique tag in subsequent transmissions to the first computing device so that the first computing device may determine whether or not packets received by the first computing device are from the second computing device by identifying the unique tag and not the respective address of the second computing device.

In some embodiments the first and second computing devices subscribe to Internet Protocol (IP). Accordingly: i) The respective addresses of the first and second computing devices are IP addresses; ii) The connection between the first and second computing devices is considered an IP session unique to the connection between the first and second computing devices; and iii) The transmissions between the first and second computing devices are IP packets, each IP packet having a respective payload. In such embodiments the unique tag is a static element associated with overhead of the IP session that would normally be present in IP packets. Furthermore, the respective payloads of IP packets are encrypted so that only the first and second computing devices can decrypt the respective payloads. Alternatively, the unique tag may also be encrypted such that only the first and second computing devices can decrypt it.

In other embodiments the first computing device is an IP gateway (or server) and the second computing device is a mobile computing device. In such embodiments there may also be at least one wireless access point coupled to the IP gateway, the wireless access point providing a coverage area from within which the mobile computing device can communicate with the wireless access point.

According to a second aspect of the invention, provided is a method for a first computing device to identify a plurality of other computing devices that each communicate with the first computing device, the first computing device and the plurality of other computing devices each having a respective address. The method involves: i) The first communicating device associating the plurality of other computing devices with a corresponding plurality of unique tags; and ii) The first computing device respectively transmitting each of the plurality of unique tags to each of the corresponding plurality of other computing devices such that each computing device receives one of the plurality of unique tags; whereby in use each of the plurality of unique tags is used by the first computing device to identify transmissions from a corresponding one of the plurality of other computing devices without the first computing device having to rely on the respective addresses of the plurality of other computing devices.

In some embodiments the first computing device and the plurality of other computing devices all subscribe to Internet Protocol (IP). Accordingly: i) The respective addresses of the first computing device and the plurality of other computing devices are IP addresses; ii) Each respective connection between the first computing device and each of the plurality of other computing devices is considered a unique IP session between the first computing device and a respective one of the plurality of other computing devices; and iii) The transmissions from any one of the plurality of other computing devices to the first computing device are IP packets.

According to a third aspect of the invention, provided is a first computing device adapted to identify a plurality of other computing devices that each communicate with the first computing device, the first computing device and the plurality of other computing devices each having a respective address, the first computing device identifying any one of the plurality of other computing devices by: i) Associating the plurality of other computing devices with a corresponding plurality of unique tags; and ii) Transmitting each of the plurality of unique tags to each of the corresponding plurality of other computing devices such that each computing device receives one of the plurality of unique tags; whereby in use each of the plurality of unique tags is used by the first computing device to identify transmissions from a corresponding one of the plurality of other computing devices without the first computing device having to rely on the respective addresses of the plurality of other computing devices.

In some embodiments the first computing device and the plurality of other computing devices are all adapted to subscribe to Internet Protocol (IP). Accordingly: i) The respective addresses of the first computing device and the plurality of other computing devices are IP addresses; ii) Each respective connection between the first computing device and each of the plurality of other computing devices is considered a unique IP session between the first computing device and a respective one of the plurality of other computing devices; and iii) The transmissions from any one of the plurality of other computing devices to the first computing device are IP packets.

Other aspects and features of the present invention will become apparent, to chose ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
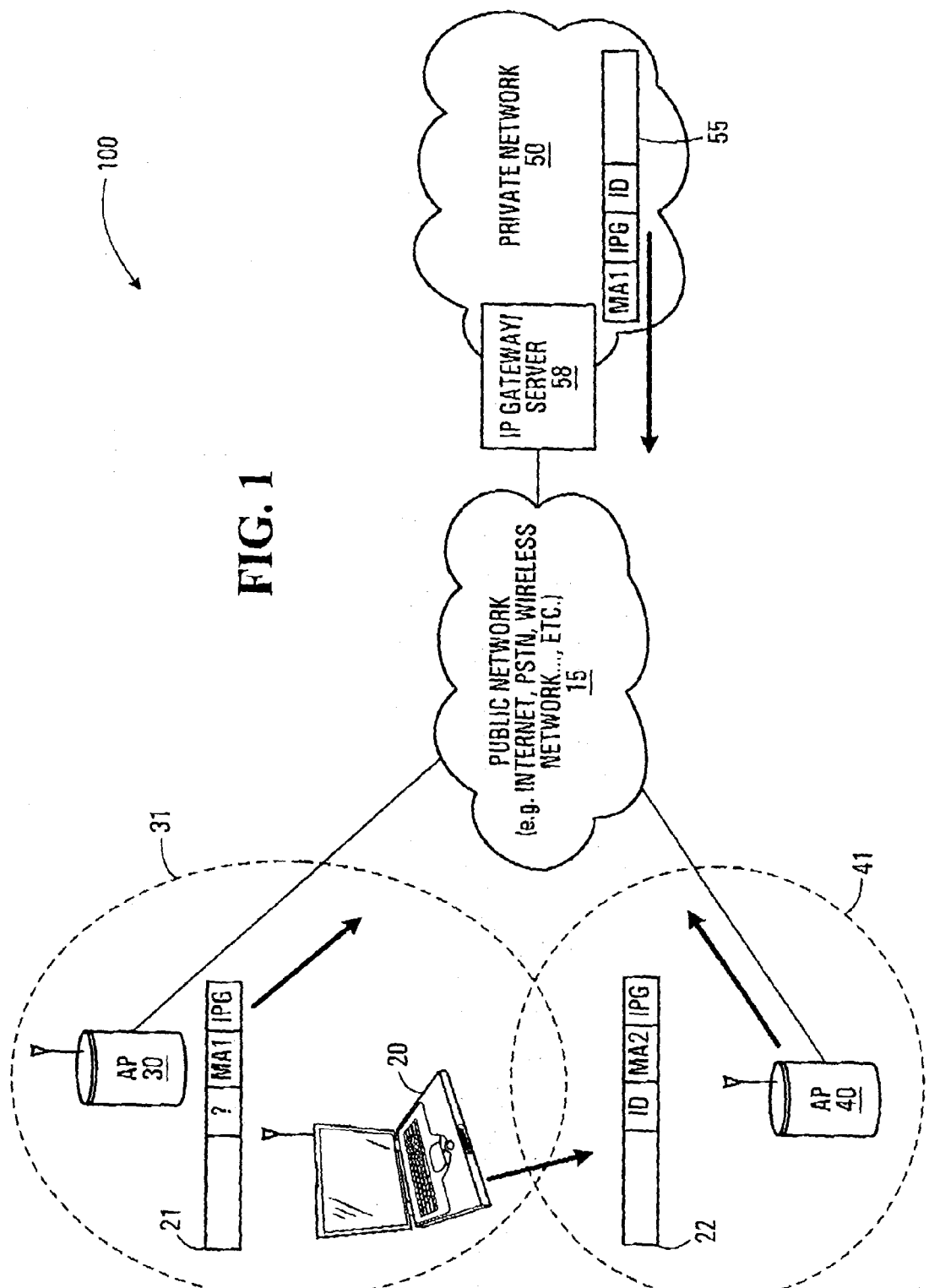
FIG. 1 is a system view of an example communications environment in which the present invention may be employed.

Referring to FIG. 1, shown is a system view of an example communication environment, generally indicated by 100, in which the present invention may be employed. The example communication environment 100 is made up of a private network 50, a public network 15 and two mobile Access Points (AP) 30 and 40.

The private network 50 has an IP gateway (or server) 58 that serves as a point of access to the public network 15. The private network 50 may be a physically separate network from the public network 15 or it may be a Virtual Private Network (VPN) within or overlapping the public network 15.

The public network 15 may be a combination of various publicly available networks such as the internet, optical metro-networks, the Public Switched Telephone Network (PSTN) and various wireless networks, etc. It would be appreciated by those skilled in the are that both the private and public networks 50 and 15 could be supported by an additional combination of copper and fiber cabling, wireless links, hardware, firmware, and software.

Access points AP 30 and AP 40 have respective coverage areas 31 and 41. Each coverage area 31 and 41 is a softly delineated geographic area in which mobile computing devices (or generally mobile clients), such as mobile unit MU 20, access the communication environment 100 through either the AP 30 or the AP 40 respectively. Generally, wireless access points can be, for example, cellular base stations or WiFi LAN access points that are connected to or integrated with routers coupled to the public network 15 or another private network (not shown). Clearly, as shown in FIG. 1 AP 30 and AP 40 both provide a wireless access point to the public network 15 that is used by the MU 20 for IP communications. Similar to many wireless access schemes it can be assumed that the MU 20 will use either the AP 30 or the AP 40 depending upon which of the two access points is closest and/or from which of the two access points the strongest signal is received.

According to the present invention the IP gateway 58 is adapted to identify mobile computing devices, such as the MU 20, by a unique static element of a respective IP session established for the MU 20 by a device within the private network 50, such as the IP gateway 58.

Figure 2:
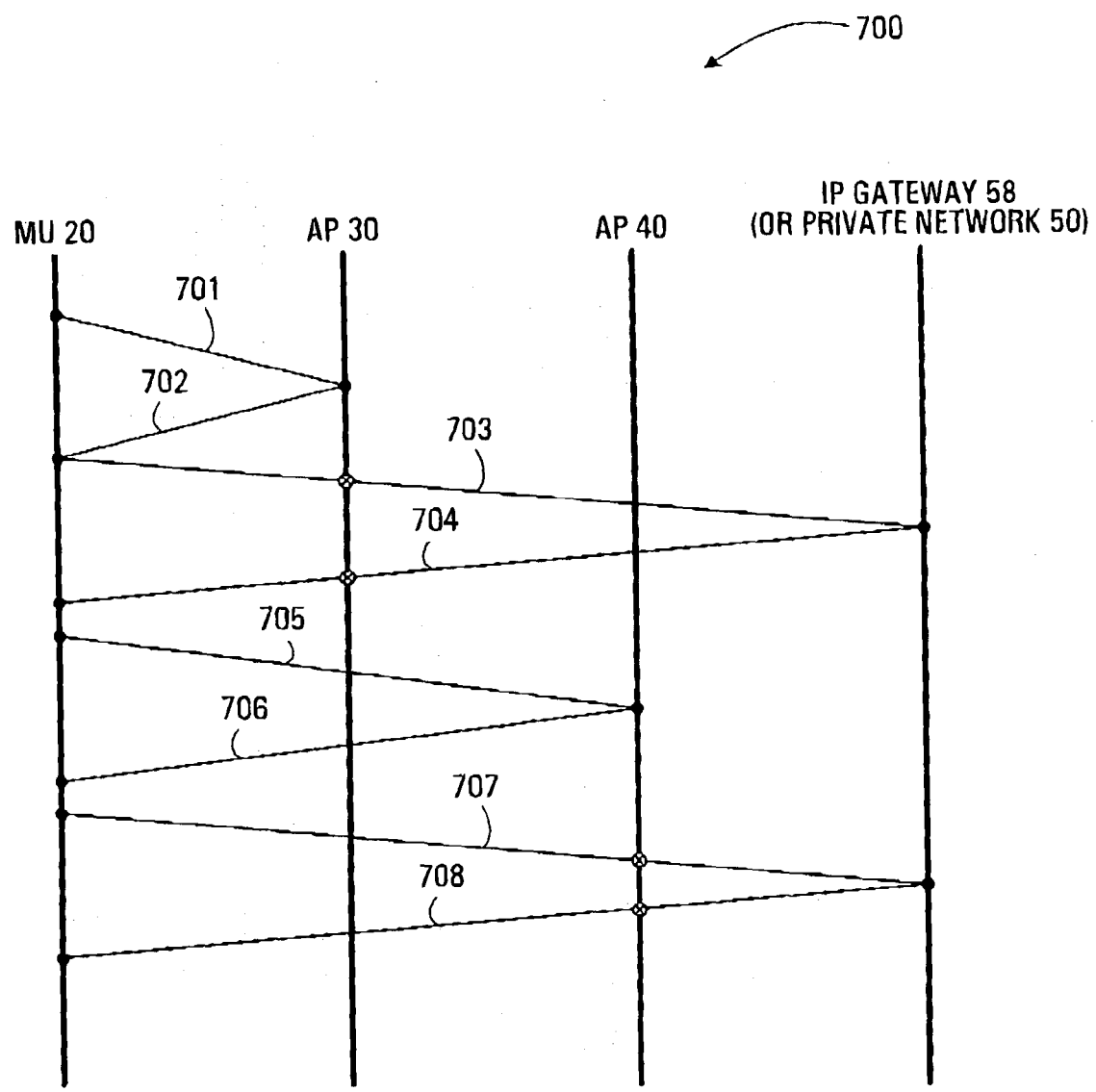
FIG. 2 is a signalling diagram illustrating an example signalling exchange according to an embodiment of the invention within the example communications environment shown in FIG. 1.

Referring to FIG. 2, and with further reference to FIG. 1, shown is an example signalling exchange 700 that starts with a request for access 701 received by the AP 30 from the MU 20 when the MU 20 initializes communication within the coverage area 31. The AP 30 upon receiving the request for access assigns the MU 20 a first IP address MA1 that it sends to the MU 20 as indicated by transmission 702.

This first exchange (transmission 701 and 702) between the MU 20 and the AP 30 could occur on any wireless channel supported by the AP 30. For example, it could occur on either a random access channel, system access channel or paging channel (or the like). Equivalently, it could even occur on a dedicated data and signalling channel supported by the AP 30. Additionally, it would be appreciated by those skilled in the art that additional signalling and acknowledgements could occur between the MU 20 and the AP 30 without departing from the scope or spirit of the invention. Thus, only those exchanges related specifically to the invention are shown in FIG. 2.

As per transmission 703, upon receiving the first IP address MA1 from the AP 30 the MU 20 can transmit an IP packet 21 (shown in FIG. 1) directed to the IP gateway 58 of the private network 50. The IP packet 21 carries with it a destination IP address IPG that is the IP address of the IP gateway 58 and a source IP address, which is the same as the first IP address MA1 assigned to the MU 20. The IP packet 21 travels to the IP gateway 58 via the AP 30 and the public network 15.

The IP packet 21 (or copy of it) is the first IP packet to be received by the IP gateway 58 from the MU 20 and accordingly it serves as a request for an IP connection to the IP gateway 58. Upon receiving the IP packet 21 the IP gateway 58 stores the source address MA1 in a session table (or the like). Then IP gateway 58 possibly in combination with other devices (not shown) of the private network 50 act to set up (register) a new IP session belonging to the MU 20. The IP session belonging to MU 20 will have at least one unique static element, such as a session identification number (ID), that can be used in place of the source IP address to identify the MU 20 and IP packets originating from the MU 20. The at least one unique element is associated with the current source address MA1 in the session table. The details of all IP sessions each belonging to a mobile device are stored in the IP gateway. Again, it would be appreciated by those skilled in the art that additional signalling and acknowledgements could occur between the MU 20 and the IP gateway 58 without departing from the scope or spirit of the invention.

As per transmission 704 of the signalling exchange 700, the IP gateway 58 is then used to transmit a connection acknowledgement IP packet 55 over the public network 15 through the AP 30 to the MU 20. The connection acknowledgement IP packet 55 carries with it MA1 as its destination IP address (i.e. the first IP address assigned to MU 20) and IPG as its source IP address (i.e. the IP address of the IP gateway 58). The connection acknowledgement IP packet 55 also contains the at least one unique static element of the IP session so that the at least one unique static element of IP session can be included in subsequent transmissions from the MU 20.

It is preferable that the at least one static element of the IP session used by both the IP gateway 58 and the MU 20 is an element that would be present in the payload of an IP packet during a normal IP session. In the present example illustrated in FIGS. 1 and 2 the at least one unique static element is the session ID as suggested above. In any case and in other words, it is preferable that the at least one unique static element of the IP session is not an additional piece of information to be placed within or appended to an IP packet. There are many such elements that exist in TCP/IP networking, such as the session ID used here. However, those skilled in the art would appreciate that other elements could be used as well. Additionally, it is of interest to note that the connection acknowledgement IP packet 55 may also contain data in its payload.

Successfully receiving the connection acknowledgement IP packet 55 is understood to mean that the MU 20 has successfully established an IP connection with the IP gateway 58. Once the IP connection has been established the MU 20 is able to move out of coverage area 31 and into, for example, coverage area 41. Again, coverage area 41 is the softly delineated geographic area serviced by the AP 40. As MU 20 moves into coverage area 41 it would be simultaneously signalling that it is on and requesting access from an access point as indicated by 705 in FIG. 2. Again, as for the AP 30 this type of signalling can occur on any channel supported by the AP 40 and preferably it would occur on a random access channel (or the like). Given that the AP 40 receives such a signal, the AP 40 would respond with transmission 706 to provide the MU 20 with a new (second) IP address MA2.

Upon receiving the second IP address MA2 the MU 20 is capable of transmitting packets directed to the IP gateway 58 via the AP 40 but no longer via the AP 30. For example, as per transmission 707 of the example signalling exchange 700 the MU 20 sends a second IP packet 22 via the AP 40 through the public network 15 to the private network 50. The second IP packet 21 carries with it IPG as its destination IP address (i.e. the IP address of the IP gateway 58) and MA2 as its source IP address (i.e. the second IP address assigned to the MU 20). As well, the second IP packet must also contain the at least one unique static element of the IP session associated with the MU 20. Thus, upon receiving the second IP packet 22 via the public network 15 the IP gateway 58 can identify the second IP packet 22 as originating from the MU 20 by checking for the at least one unique static element of the IP session. Clearly, the second IP packet 22 can also be identified as belonging to the IP session established for the MU 20 by checking for the at least one unique static element of the IP session sent within the second IP packet 22. The second IP address MA2 is used as the destination address in IP packets to be sent to the MU 20 until the IP gateway 58 receives a subsequent packet from the MU 20 indicating that it has been assigned another IP address.

For all subsequent transmissions the IP gateway 58 will send IP packets destined for MU 20 with a destination address corresponding to the most current IP address extracted from the last IP packet received from the MU 20. For example, as per transmission 708 in the example signalling exchange 700 the IP gateway 58 sends another IP packet (not shown) to the MU 20 (in coverage area 41) using the second address MA2.

Generally, the most recent IP address of a particular mobile unit and an at least one unique static element of the IP session associated with the mobile unit could be stored together in a session table.

As well in alternative embodiments the payload section of IP packets (e.g. the connection acknowledgement IP packet 55) could be encrypted such that only the mobile unit and IP gateway 58 (or server) would be able to decrypt it. Alternatively, only a portion of the payload section of an IP packet could be encrypted. Accordingly, only the mobile unit and a device within a private network (e.g. an IP gateway) would have access to the payload or portion thereof.

Figure 3:
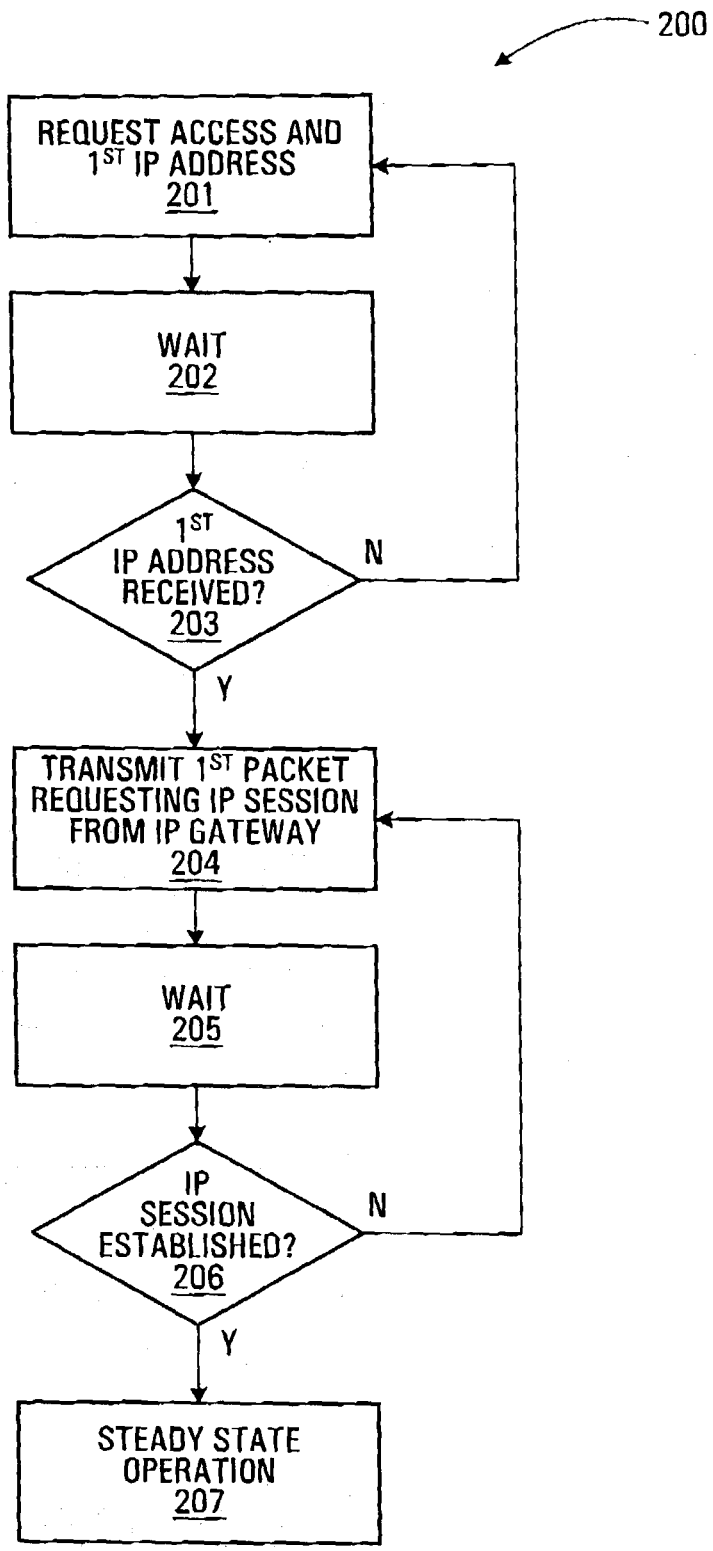
FIG. 3 is a flow chart detailing an initialization method according to an embodiment of the invention.

Generally, the portion of the example signalling exchange 700 that enables true mobility in a mobile environment according to an embodiment of the invention is summarized in the flow chart shown in FIG. 3. Specifically, FIG. 3 is a flow chart, indicated generally by 200, that details steps of a method of initialization (registration) according to an embodiment of the invention.

Initially, at step 201, once a mobile unit decides to initiate communications, it sends a transmission requesting access and a first IP address from an available access point. This is followed by step 202 in which the mobile unit waits for a response that includes the first IP address.

After the wait step 202, at step 203 the mobile unit makes a decision on whether or not it has been acknowledged by an access point and thus has an IP address. If it does not yet have an IP address (no path, step 203) the mobile unit starts again at step 201. On the other hand if it determines that it has been assigned an IP address by an access point AP (yes path, step 203) then the mobile unit can proceed to step 204.

Step 204 is similar to step 201, however in this step the mobile unit transmits a first IP packet using the IP address it has been assigned directed to a remote IP gateway (or server) that it is trying to communicate with. Again, at 205 the mobile unit waits for a response in a manner similar to step 202.

After waiting some time, the mobile unit at step 206 makes a decision to determine whether or not it has established an IP session with the remote IP gateway. If the mobile unit determines that an IP session has not been established (no path, 206) then it repeats steps starting step 204. On the other hand, if it has established an IP session with the remote IP gateway (yes path, step 206), then it can proceed to communicate freely with the remote IP gateway as described above (step 207) in relation to FIGS. 1 and 2.

The method described in relation to FIG. 3 assumes that the remote IP gateway has been adapted or programmed to associate the mobile unit and packets originating from a mobile unit with at least one unique static element of the IP session that it establishes for the mobile unit. Moreover, is required that that at least one unique static element of the IP session associated with the mobile unit has been transmitted to the mobile unit when the mobile unit makes its decision at step 206.

What has been described is merely illustrative of the application of the principles of the invention. Other arrangements and methods can be implemented by those skilled in the art without departing from the spirit and scope of the present invention.

I claim:

1. A method for a first computing device to identify a second computing device, wherein both the first and second computing devices have addresses, the method comprising:
   the first computing device associating a unique tag with the second computing device that is not the respective address of the second computing device or another address;
   the first computing device transmitting the unique tag to the second computing device so that the second computing device is made aware of the unique tag;
   the first computing device determining whether or not packets received by the first computing device are from the second computing device by identifying the unique tag and not the respective address of the second computing device.

2. The method of claim 1, wherein the first and second computing devices subscribe to Internet Protocol (IP) and accordingly:
   the respective addresses of the first and second computing devices are IP addresses;
   the connection between the first and second computing devices is considered an IP session unique to the connection between the first and second computing devices; and
   the transmissions between the first and second computing devices are IP packets, each IP packet having a respective payload.

3. The method of claim 2, wherein the first computing device is an IP gateway (or server) and the second computing device is a mobile computing device.

4. The method of claim 3, wherein there is at least one wireless access point coupled to the IP gateway, the wireless access point providing a coverage area from within which the mobile computing device can communicate with the wireless access point.

5. The method of claim 2, wherein the unique tag is a static element associated with overhead of the IP session that would normally be present in IP packets.

6. The method according to claim 2, wherein the respective payloads or IP packets are encrypted so that only the first and second computing devices can decrypt the respective payloads.

7. The method according to claim 6, wherein the encryption is done according to IPSec.

8. The method according to claim 2, wherein the unique tag is encrypted so that only the first and second computing devices can decrypt the unique tag.

9. The method according to claim 8, wherein the encryption is done according to IPSec.

10. A method for a first computing device to identify a plurality of other computing devices that each communicate with the first computing device, the first computing device and the plurality of other computing devices each having a respective address, the method comprising:
    the first communicating device associating the plurality of other computing devices with a corresponding plurality of unique tags that are not the respective addresses of the plurality of other computing devices or other respective addresses; and
    the first computing device respectively transmitting each of the plurality of unique tags to each of the corresponding plurality of other computing devices such that each computing device receives one of the plurality of unique tags;
    whereby in use each of the plurality of unique tags is used by the first computing device to identify transmissions from a corresponding one of the plurality of other computing devices without the first computing device having to rely on the respective addresses of the plurality of other computing devices.

11. The method of claim 10, wherein the first computing device and the plurality of other computing devices all subscribe to Internet Protocol (IP) and accordingly:
    the respective addresses of the first computing device and the plurality of other computing devices are IP addresses;
    each respective connection between the first computing device and each of the plurality of other computing devices is considered a unique IP session between the first computing device and a respective one of the plurality of other computing devices; and
    the transmissions from any one of the plurality of other computing devices to the first computing device are IP packets.

12. A first computing device adapted to identify a plurality of other computing devices that each communicate with the first computing device, the first computing device and the plurality of other computing devices each having a respective address, wherein the first computing device comprises:
    communication circuitry, configured to perform communication with at least the other computing devices; and
    processing hardware coupled to the communication circuitry, wherein the processing hardware is configured to operate with the communication circuitry to identify any one of the plurality of other computing devices by:
      associating the plurality of other computing devices with a corresponding plurality of unique tags that are not the respective addresses of the plurality of other computing devices or other respective addresses; and
      transmitting each of the plurality of unique tags to each of the corresponding plurality of other computing devices such that each computing device receives one of the plurality of unique taps;
    whereby in use each of the plurality of unique tags is used by the first computing device to identify transmissions from a corresponding one of the plurality of other computing devices without the first computing device having to rely on the respective addresses of the plurality of other computing devices.

13. The apparatus of claim 12, wherein the first computing device and the plurality of other computing devices are all adapted to subscribe to Internet Protocol (IP) and accordingly:
    the respective addresses of the first computing device and the plurality of other computing devices are IP addresses;
    each respective connection between the first computing device and each of the plurality of other computing devices is considered a unique IP session between the first computing device and a respective one of the plurality of other computing devices; and iii) the transmissions from any one of the plurality of other computing devices to the first computing device are IP packets.

14. A method for identification of a mobile computing device by a first computing device, wherein both the mobile computing device and the first computing device have addresses, the method comprising:

the mobile communication device receiving a unique tag from the first computing device, wherein the unique tag is associated with the mobile computing device and is not the respective address of the mobile computing device or another address;

the mobile computing device including the unique tag in subsequent transmissions to the first computing device so that the first computing device may determine whether or not packets received by the first computing device are from the mobile computing device by identifying the unique tag and not the respective address of the mobile computing device.

15. The method of claim 14, wherein the mobile computing device and the first computing device subscribe to Internet Protocol (IP) and accordingly:

the respective addresses of the mobile computing device and the first computing device are IP addresses;

the connection between the mobile computing device and the first computing device is considered an IP session unique to the connection between the mobile computing device and the first computing device; and the transmissions between the mobile computing device and the first computing device are IP packets, each IP packet having a respective payload.

16. The method of claim 14, wherein the first computing device is an IP gateway.

17. The method of claim 14, wherein the unique tag is a static element associated with overhead of an IP session that would normally be present in IP packets.

18. A mobile computing device, comprising:

communication circuitry, configured to communicate with at least a first computing device, wherein both the mobile computing device and the first computing device have addresses; and processing hardware coupled to the communication circuitry, wherein the processing hardware is configured to operate with the communication circuitry to:

receive a unique tag from the first computing device, wherein the unique tag is associated with the mobile computing device and is not the respective address of the mobile computing device or another address;

include the unique tag in subsequent transmissions to the first computing device so that the first computing device may determine whether or not packets received by the first computing device are from the mobile computing device by identifying the unique tag and not the respective address of the mobile computing device.

19. The mobile computing device of claim 18, wherein the first computing device is an IP gateway.

20. The mobile computing device of claim 18, wherein the unique tag is a static element associated with overhead of an IP session that would normally be present in IP packets.

\* \* \* \* \*